United States Patent
Judd et al.

(10) Patent No.: US 10,666,819 B2
(45) Date of Patent: May 26, 2020

(54) ELECTRONIC DEVICE AND IMAGE FORMING APPARATUS THAT TAKE SCREENSHOT OF IMAGE BEING DISPLAYED ON DISPLAY TO THEREBY ACQUIRE THE IMAGE

(71) Applicant: KYOCERA Document Solutions Inc., Osaka (JP)

(72) Inventors: Isaac Judd, Osaka (JP); Shoichi Sakaguchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/514,053

(22) Filed: Jul. 17, 2019

(65) Prior Publication Data
US 2020/0036844 A1    Jan. 30, 2020

(30) Foreign Application Priority Data
Jul. 27, 2018  (JP) ................................ 2018-141793

(51) Int. Cl.
*G06F 3/12* (2006.01)
*H04N 1/00* (2006.01)

(52) U.S. Cl.
CPC ..... *H04N 1/00474* (2013.01); *H04N 1/00411* (2013.01); *H04N 1/00472* (2013.01); *H04N 1/00506* (2013.01); *H04N 2201/0094* (2013.01)

(58) Field of Classification Search
CPC ........... H04N 1/00474; H04N 1/00411; H04N 1/00472; H04N 1/00506; H04N 2201/0094; H04N 2201/0096
See application file for complete search history.

(56) References Cited

U.S. PATENT DOCUMENTS

| | | | | |
|---|---|---|---|---|
| 2009/0138812 A1* | 5/2009 | Ikedo | ................... | G06F 40/166 715/769 |
| 2009/0251423 A1* | 10/2009 | Jung | ..................... | G06F 3/0488 345/173 |
| 2013/0293664 A1* | 11/2013 | Tsang | .................. | H04L 12/1827 348/14.03 |
| 2018/0113660 A1* | 4/2018 | Su | ......................... | G06F 3/1272 |
| 2019/0251342 A1* | 8/2019 | Zhao | ..................... | H04L 65/403 |

FOREIGN PATENT DOCUMENTS

JP          2017-204191 A      11/2017

* cited by examiner

*Primary Examiner* — Moustapha Diaby
(74) *Attorney, Agent, or Firm* — IP Business Solutions, LLC

(57) ABSTRACT

An electronic device includes a display and a control unit. The control unit includes a processor and functions, when the processor executes a control program, as a screenshot executing section and a control section. The screenshot executing section acquires an image being displayed on the display. When an image is displayed on the display and a preset condition is satisfied, the control section causes the display to display a message indicating that the image can be acquired by the screenshot executing section.

8 Claims, 6 Drawing Sheets

ELECTRONIC DEVICE AND IMAGE FORMING APPARATUS THAT TAKE SCREENSHOT OF IMAGE BEING DISPLAYED ON DISPLAY TO THEREBY ACQUIRE THE IMAGE

INCORPORATION BY REFERENCE

This application claims priority to Japanese Patent Application No. 2018-141793 filed on Jul. 27, 2018, the entire contents of which are incorporated by reference herein.

BACKGROUND

The present disclosure relates to an electronic device and an image forming apparatus that take a screenshot of an image being displayed on a display to thereby acquire the image. Particularly, the disclosure relates to a technique for supporting use of a screenshot function.

There are electronic devices (e.g. smart phones and information processing devices) equipped with functions for acquiring images being displayed on displays, by taking screenshots of the images. For example, when images are acquired by screenshot executing sections under predetermined conditions and are stored into storage sections, conventional information processing devices cause near field communication sections to transmit the images to image forming apparatuses.

SUMMARY

A technique improved over the aforementioned technique is proposed as one aspect of the present disclosure.

An electronic device according to one aspect of the present disclosure includes a display and a control unit. The control unit includes a processor and functions, when the processor executes a control program, as a screenshot executing section and a control section. The screenshot executing section acquires an image being displayed on the display. When an image is displayed on the display, and moreover a preset condition is satisfied, control section causes the display to display a message indicating that the image can be acquired by the screenshot executing section.

An image forming apparatus according to another aspect of the present disclosure includes the above-described electronic device and an image forming unit forming the image acquired by the screenshot executing section on a recording sheet.

DETAILED DESCRIPTION

Figure 1:
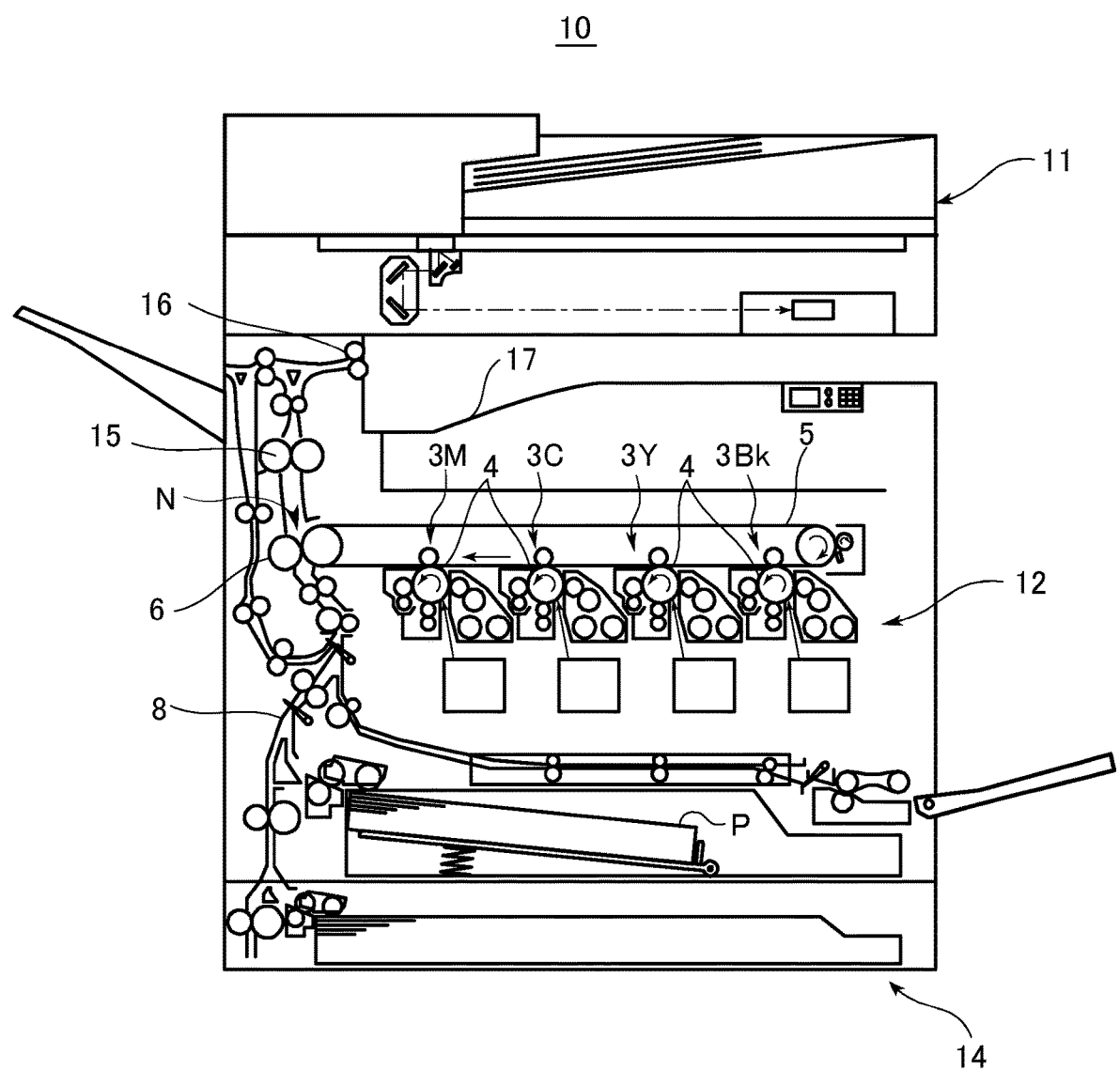
FIG. 1 is a cross-sectional view showing an image forming apparatus that is an example of an electronic apparatus according to an embodiment of the present disclosure.

Hereinafter, a description will be given of an embodiment of the present disclosure with reference to the drawings. FIG. 1 is a cross-sectional view showing an image forming apparatus that is an example of an electronic apparatus according to the one embodiment of the present disclosure. The image forming apparatus 10 of the present embodiment is a multi-function peripheral (MFP) having multiple functions, including a copy function, a print function, and a scan function. The image forming apparatus 10 includes an image reading unit 11 and an image forming unit 12.

The image reading unit 11 has an image sensor element that optically reads an image of a document. Analog output of the image sensor element is converted to a digital signal to generate image data representing the image of the document.

The image forming unit 12 is a unit that forms on a recording sheet the image represented by the aforesaid image data and that includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges a surface of a photosensitive drum 4, exposes the surface of the photosensitive drum 4 to light to form an electrostatic latent image on the surface of the photosensitive drum 4, develops the electrostatic latent image formed on the surface of the photosensitive drum 4 into a toner image, and primarily transfers the toner image on the surface of the photosensitive drum 4 to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording sheet P conveyed from a sheet feed section 14 via a conveyance path 8.

Thereafter, heat and pressure are applied to the recording sheet P by a fixing device 15, so that the toner image on the recording sheet P is fixed by heat and pressure. Then, the recording sheet P is discharged through an ejection roller 16 to a sheet output tray 17.

Figure 2:
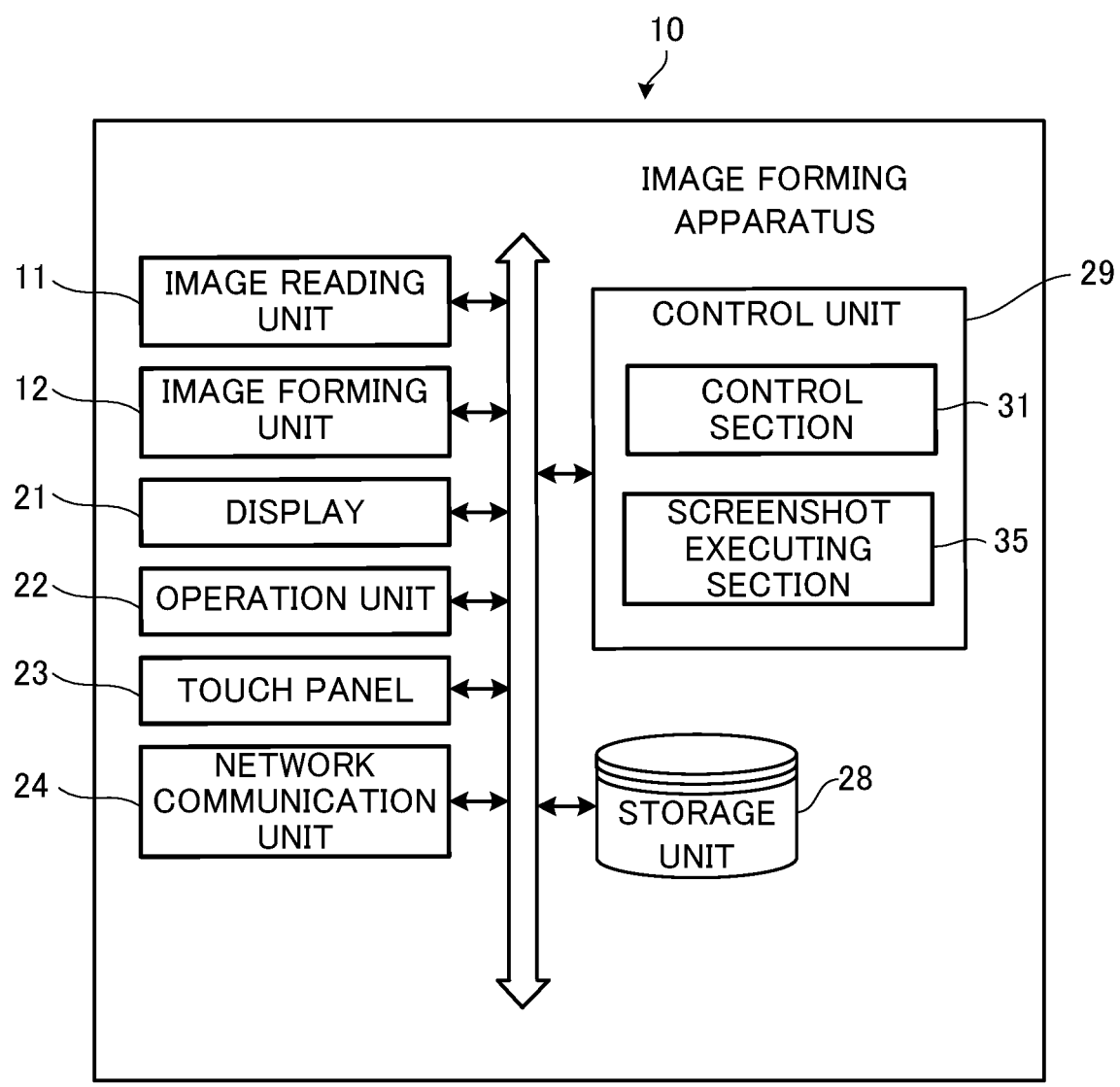
FIG. 2 is a block diagram showing an essential internal configuration of the image forming apparatus according to the one embodiment.

Next, a description will be given of a configuration related to the control of the image forming apparatus 10. FIG. 2 is a functional block diagram showing an essential internal configuration of the image forming apparatus 10. As shown in FIG. 2, the image forming apparatus 10 includes the image reading unit 11, the image forming unit 12, a display 21, an operation unit 22, a touch panel 23, a network communication unit 24, a storage unit 28, and a control unit 29. These components can transfer data or signals to and from one another via a bus.

The display 21 is formed of a liquid crystal display (LCD), an organic electro-luminescence (OLED: Organic Light-Emitting Diode) display or the like. The operation unit 22 includes physical keys such as numeric keys, an Enter key, and a Start key.

The display 21 is provided with the touch panel 23 disposed on a screen thereof. The touch panel 23 is a touch panel of, for example, a so-called resistive film type or electrostatic capacitance type, and detects a user's touch, for example by a finger, together with its touched position, and upon detecting the touch, the touch panel 23 outputs a detection signal indicating the coordinates of the touched position to, for example, a control section 31 (to be described later) of the control unit 29. Examples of user operation on the touch panel 23 include so-called touching operation, sliding operation, drag operation, pinching out operation, and pinching in operation. The control section 31 discriminates these operations based on the detection signals of the touch panel 23.

The network communication unit (NW communication unit) 24 is a communication interface having a communication module such as an un-illustrated LAN chip. The image forming apparatus 10 is connected via the network communication unit 24 to other terminal devices, such as a personal computer (PC) and the server that are on a network, to exchange data with the PC and the server.

The storage unit 28 is a large-capacity storage device such as a solid state drive (SSD) and a hard disk drive (HDD), and stores, for example, various application programs and various kinds of data.

The control unit 29 includes, for example, a processor, a random access memory (RAM), and a read only memory (ROM). Examples of the processor include a central processing unit (CPU), an application specific integrated circuit (ASIC), and a micro processing unit (MPU). The control unit 29 functions as the control section 31 and a screenshot executing section 35 when a control program stored in the ROM or the storage unit 28 is executed by the processor.

The control section 31 governs overall operation control of the image forming apparatus 10. The control unit 29 is connected to the image reading unit 11, the image forming unit 12, the display 21, the operation unit 22, the touch panel 23, the network communication unit 24, and the storage unit 28. The control section 31 performs the operation control of these components and signal and data exchange with the individual components.

The control section 31 performs a role as a processing unit that executes various kinds of processing necessary for image formation by the image forming apparatus 10. Furthermore, based on the detection signal outputted from the touch panel 23 or operation on the physical keys of the operation unit 22, the control section 31 accepts an operation instruction inputted by the user.

The control section 31 has a function of controlling display operation of the display 21. The control section 31 also has a function of controlling communication operation of the network communication unit 24.

The screenshot executing section 35 acquires an image being displayed on the screen of the display 21 and stores the image in the storage unit 28. In short, the screenshot executing section 35 executes a so-called screenshot taking.

In the image forming apparatus 10 having the configurations as described above, the control section 31 executes various processing in accordance with user operation on the operation unit 22 or on the touch panel 23. The control section 31 retrieves from the storage unit 28 a graphic user interface (GUI) for setting details of such processing, causes the display 21 to display the GUI, retrieves various data from the storage unit 28, and causes the display 21 to display the data.

In the condition where the GUI, the various data, and a browser image (image) are being displayed on the display 21, when the user operates a screenshot key (one of the physical keys) of the operation unit 22, the control section 31 accepts the user operation on the screenshot key, and the screenshot executing section 35 acquires the image being displayed on the screen of the display 21 and stores the image in the storage unit 28.

When an image is displayed on the display 21, and moreover a preset condition is satisfied, the control section 31 causes the display 21 to display a message indicating that the image can be acquired by taking a screenshot. The user is notified by this way that the image forming apparatus 10 is provided with the screenshot function.

The condition is that enlarging, reducing, or moving of the image being displayed on the display 21 is instructed by the user operation on the touch panel 23. Operation for instructing enlargement of an image is a pinch-out operation; operation for instructing reduction of an image is a pinch-in operation; operation for instructing movement of an image is slid operation; and all of these user operations are performed on the touch panel 23. The control section 31 accepts the pinch-out, pinch-in, or slid operation performed on the touch panel 23 to enlarge, reduce, or move the image being displayed on the display 21. Accordingly, when satisfying a condition (1) that an image is displayed on the display 21 and a condition (2) that the pinch-out, pinch-in, or slide operation is performed and the image is enlarged, reduced, or moved, the control section causes the display to display the message.

Also, the condition is that a prescribed type of image previously stored in the storage unit 28 is displayed on the display 21. For example, the control section 31 identifies the type of the image by referring to the file extension of the image for each image. When the image is displayed on the display 21, the control section 31 refers to the file extension of the image, and when the file extension matches with a prescribed file extension (prescribed type of the image) previously stored in the storage unit 28, the control section 31 causes the display 21 to display the message.

Also, the condition is that the image being displayed on the display 21 is of a same type with an image having been acquired previously by the screenshot function. Every time an image is acquired through screenshot taking, the control section 31 stores the file extension of each image in the storage unit 28 as history information RD so that each of the file extensions is kept. When the image is displayed on the display 21, the control section 31 refers to the file extension of the image, and when the file extension matches with any of the file extensions (image types) stored as the history information RD, the control section 31 causes the display 21 to display the message.

Next, with reference to the flowchart shown in FIG. 3, detail descriptions will be given to procedures for causing the display to display the message indicating that the image can be acquired by taking a screenshot when the image is displayed on the display 21, and moreover a preset condition is satisfied, as described above.

Figure 4:
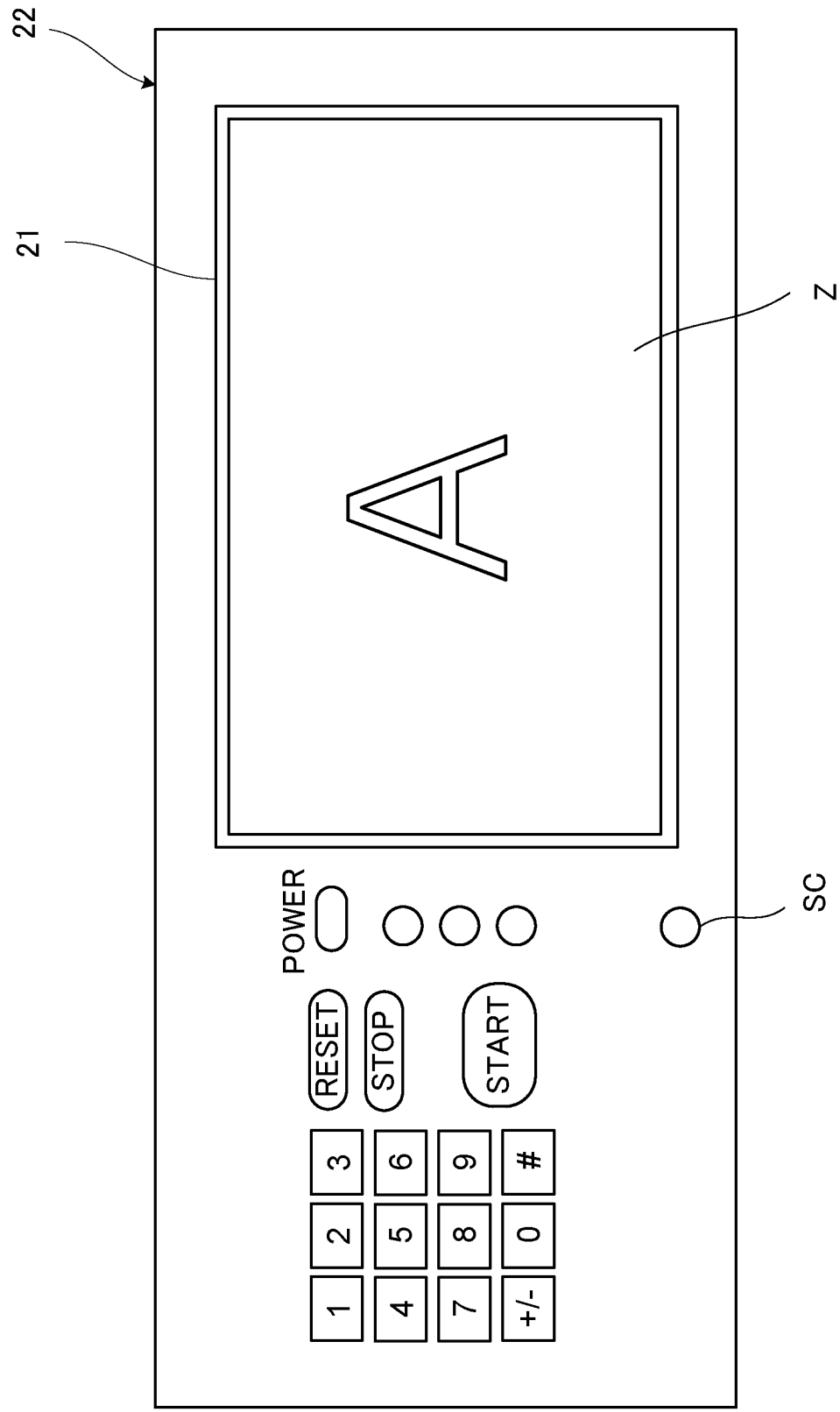
FIG. 4 is a plane view showing a display of the image forming apparatus, on which an operation unit and an image are displayed.

First, when the user operates the operation unit 22 or the touch panel 23 to instruct display of the GUI, various data, and the browser image (image), the control section 31 accepts the display instruction of the image (S101), then the control section 31 causes the display 21 to display the image (S102). For example, the control section 31: retrieves the GUI from the storage unit 28 then causes the display 21 to display the GUI; retrieves various data from the storage unit 28 then causes the display 21 to display the various data; or causes the display 21 to display the browser image having been transmitted/received between an internet and the network communication unit 24. It is thought here that an image Z illustrated in FIG. 4 is displayed on the screen of the display 21. A screenshot key (one of the physical keys) SC of the operation unit 22 is illustrated in FIG. 4.

Upon causing the display 21 to display the image, the control section 31 determines whether enlarging, reducing, or moving of the image being displayed on the display 21 has been instructed by the user operation on the touch panel 23 (S103), then refers to the file extension of the image to determine whether the file extension matches with the prescribed file extension previously stored in the storage unit 28 (S104), then refers to the file extension of the image to determine whether the file extension matches with any of the file extensions stored as the history information RD (S105).

For example, upon determining that enlarging, reducing, or moving of the image has not been instructed by the user operation on the touch panel 23 ("NO" in S103), and moreover the file extension of the image does not match with the prescribed file extension previously stored in the storage unit 28 ("NO" in S104), and moreover the file extension of the image does not match with any of file extensions stored as the history information RD ("NO" in S105), the control section 31 proceeds to processing of determining whether a screenshot executing instruction has been accepted (S106).

Figure 3:
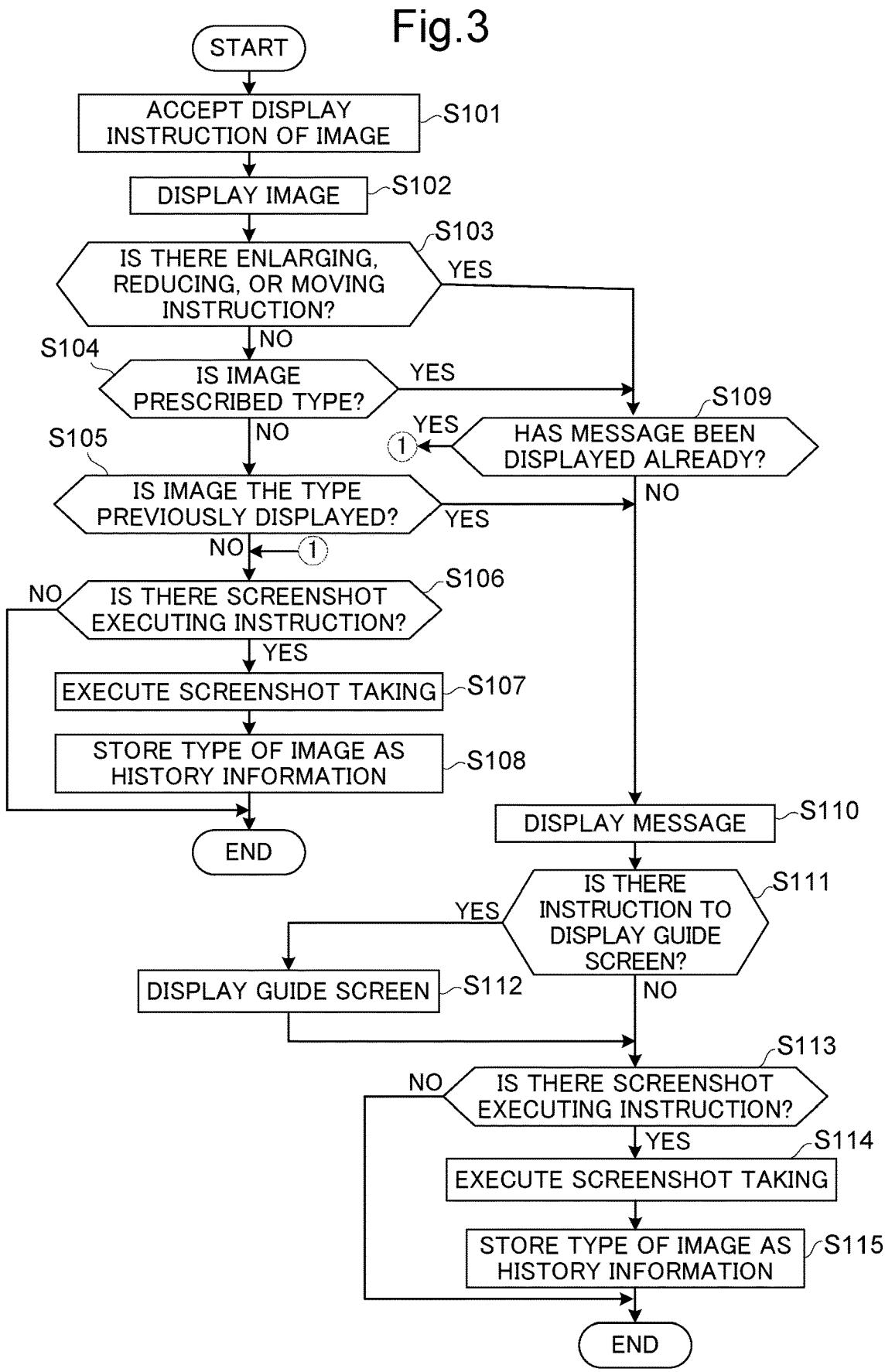
FIG. 3 is a flowchart showing procedures for displaying, when an image is displayed on the display, and moreover a preset condition is satisfied, a message indicating that the image can be acquired by taking a screenshot.

For example, when no screenshot executing instruction is inputted by the user operation on the screenshot key SC of the operation unit 22 but different processing is instructed ("NO" in S106), the control section 31 temporarily terminates the processing shown in FIG. 3. In this case, the control section 31 executes the different processing.

When the control section 31 accepts the input of the screenshot executing instruction by the user operation on the screenshot key SC of the operation unit 22 ("YES" in S106), the screenshot executing section 35 acquires the image being displayed on the screen of the display 21 and stores the image in the storage unit 28 (S107). Furthermore, the control section 31 stores the file extension of the image in the storage unit 28 as the history information RD (S108). The processing ends afterwards.

In contrast, either one of the cases of: determining that enlarging, reducing, or moving of the image has been instructed by the user operation on the touch panel 23 ("YES" in S103); or determining that the file extension of the image matches with the prescribed file extension previously stored in the storage unit 28 ("YES" in S104), the control section 31 determines whether the message indicating that the image can be acquired by taking a screenshot has been displayed after an activation of the image forming apparatus 10 (S109).

For example, upon determining that the message has already been displayed after the activation of the image forming apparatus 10 ("YES" in S109), the control section 31 proceeds to, without the display of the message, processing of determining whether the screenshot key SC on the operation unit 22 is operated (S106). Thus, if the message has already been displayed after the activation of the image forming apparatus 10, the message will not be displayed. In other words, the message is to be displayed only once during the operation of the image forming apparatus 10.

When the screenshot key SC is not operated but a different processing is instructed ("NO" in S106), the control section 31 temporarily terminates the processing shown in FIG. 3, then executes the different processing. When the control section 31 accepts the input of the screenshot executing instruction by the user operation on the screenshot key SC of the operation unit 22 ("YES" in S106), the screenshot executing section 35 acquires the image being displayed on the screen of the display 21 and stores the image in the storage unit 28 (S107). Furthermore, the control section 31 stores the file extension of the image in the storage unit 28 as the history information RD (S108). The processing ends afterwards.

In contrast, upon determining in step S109 that the message has never been displayed after the activation of the image forming apparatus 10 ("NO" in S109), the control section 31 causes the display 21 to display the message (S110). Also in the case where the file extension of the image that was displayed in step S102 upon reception of the display instruction in step S101 matches with any of the file extensions stored as the history information RD ("NO" in S104, "YES" in S105), the control section 31 causes the display 21 to display the message (S110).

Figure 5:
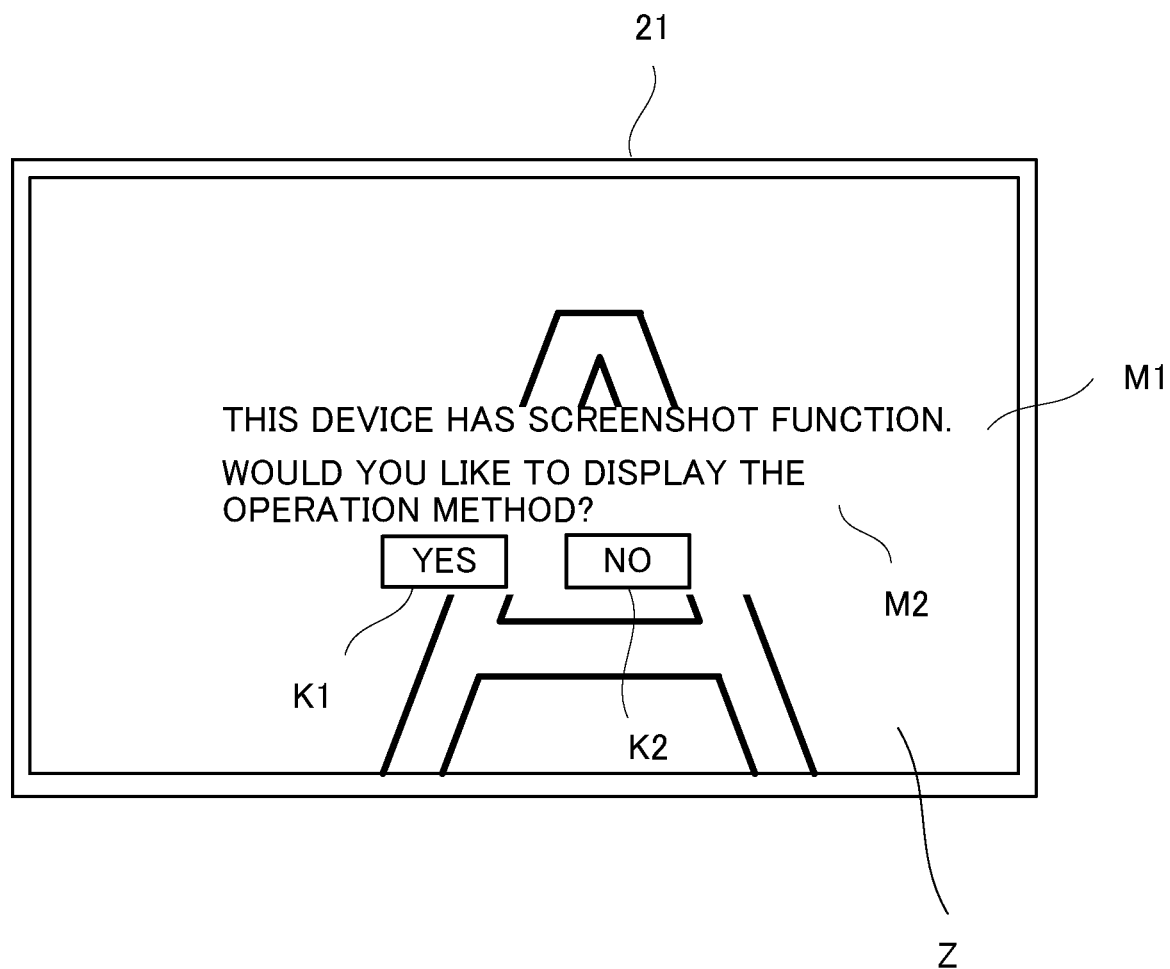
FIG. 5 is a diagram showing a screen of the display displaying the message indicating that the image can be acquired by taking a screenshot.

For example, the control section 31 causes the display 21 to display on the screen thereof a message M1 saying "this device has screenshot function" as illustrated in FIG. 5. At this time the screen of the display 21 displays not only the message M1, but also a message M2 saying "would you like to display the operation method?", an YES key K1 for requesting the display of the operation method, and a NO key K2 for not requesting the display of the operation method.

Figure 6:
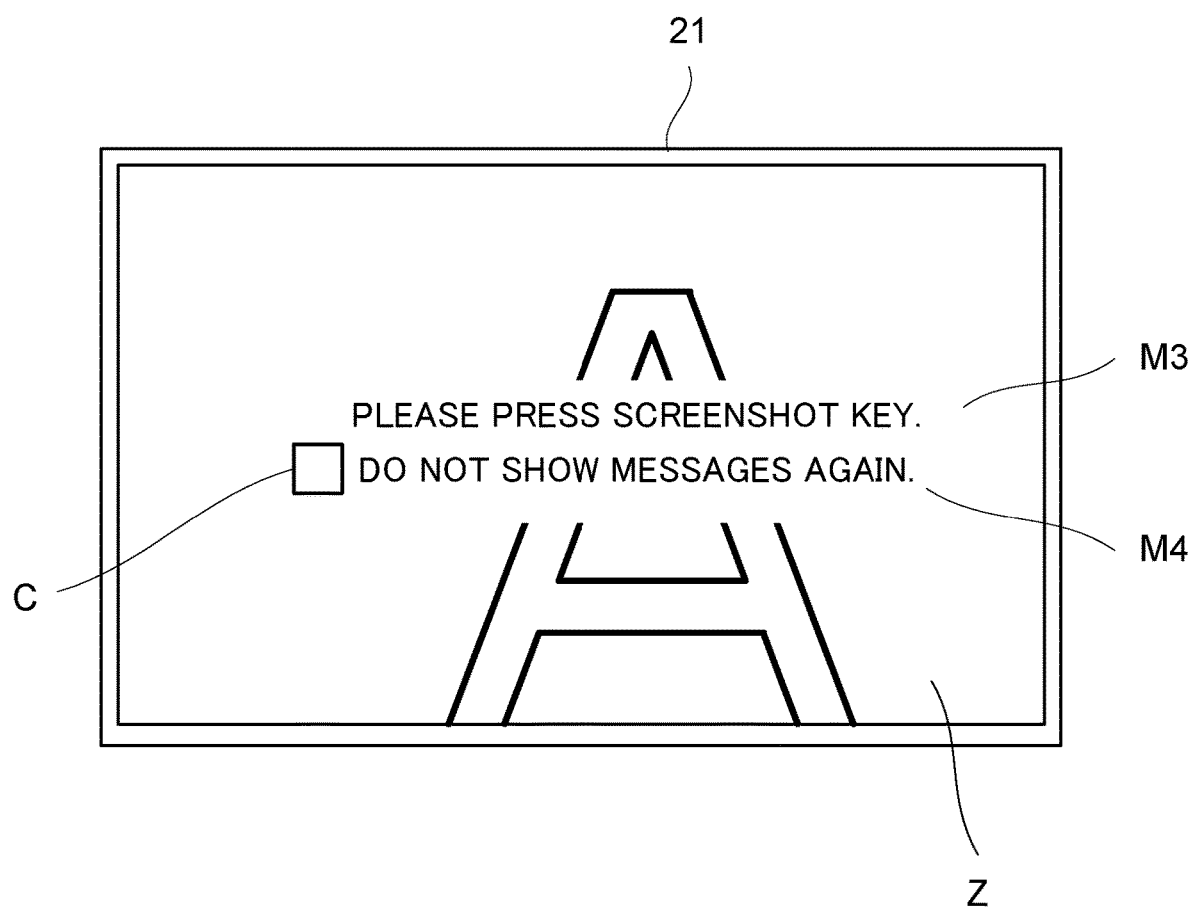
FIG. 6 is a diagram showing the screen of the display displaying a message indicating an operation method for taking a screenshot.

When the user touches the YES key K1, the control section 31 accepts through the touch panel 23 a display instruction of the operation method being associated with the YES key K1 ("YES" in S111) and causes the display 21 to display a message showing the operation method of the screenshot taking (S112). For example, a message M3 saying "please press screenshot key" as an example is shown in FIG. 6 is displayed on the screen of the display 21. At this time the screen of the display 21 displays not only the message M3, but also displays a message M4 saying "Do not show messages again" and also a checkbox C for instructing prohibition of the display of the messages M1 to M4. Seeing the message M3 displayed on the screen of the display 21, the user can understand how to operate the screenshot key SC, and also by selecting the checkbox C, the user can instruct through the touch panel 23 prohibition of the display of the messages M1 to M4. The processing of the step S113 starts afterwards.

In step S111, when the user touches the NO key K2 during the display of the message M1 shown in FIG. 5, the control section 31 accepts through the touch panel 23 an instruction not to display the operation method ("NO" in S111), the instruction being associated with the NO key K2. The processing in step S112 will not be performed. Then, step S113 for determining whether the screenshot key SC on the operation unit 22 is operated starts. Alternatively, even if the control section 31 does not receive the instruction not to display the operation method, when a fixed time has elapsed since the display of the message M1 ("NO" in S111), the control section 31 proceeds to, without performing the processing of the step S112, the processing of the step S113.

In the processing of the step S113, the control section 31 determines whether the screenshot key SC on the operation unit 22 is operated (S113), and in determining that the screenshot key SC is not operated and a different processing is instructed ("NO" in S113), the control section 31 temporarily terminates the processing shown in FIG. 3, then executes the different processing. Also, When the control section 31 accepts the input of the screenshot executing instruction by the user operation on the screenshot key SC of the operation unit 22 ("YES" in S113), the screenshot executing section 35 acquires the image being displayed on the screen of the display 21 and stores the image in the storage unit 28 (S114). The control section 31 further stores the file extension of the image in the storage unit 28 as the history information RD (S115). The processing ends afterwards.

While the message M4 shown in FIG. 6 is being displayed on the display 21, if the user touches the checkbox C being displayed in association with the message M4, the control section 31 accepts a display prohibition instruction associated with the checkbox c and from then on does not display the messages M1 to M4. In this case, the control section 31 does not perform the processing in accordance with the flowchart shown in FIG. 3 at restart of the image forming apparatus 10 and does cause the display 21 to display each of the messages M1 to M4. The screenshot executing section 35 acquires the image being displayed on the screen of the display 21 and stores the image in the storage unit 28 to store the image when the control section 31 accepts the screenshot executing instruction.

As described thus far, in the present embodiment, when an image is displayed on the display 21, and moreover the present condition is satisfied, the message indicating that the image can be acquired by taking a screenshot is displayed on the display 21. The present embodiment is thereby capable of notifying the user at a proper timing that the device at use has the screenshot function, and urging the user to utilize the function.

In recent years, the above-mentioned screenshot function has become widely used, but there are electronic devices having the screenshot function and those not. Therefore, in using the electronic device with the screenshot function, users in some cases do not take advantage of this function because the users cannot tell whether the device at use has the screenshot function or not.

The present embodiment on the other hand is capable of notifying the user at a proper timing that the device at use has the function of screenshot taking, and urging the user to utilize the function.

Although the description of the above embodiment is given taking an image forming apparatus as an example of the electronic apparatus according to the present disclosure, the example is merely illustrative and the electronic apparatus may be, for example, a personal computer and a medical equipment that are shared by multiple users. It should be noted that the electronic device of the above embodiment corresponds to the configuration excluding the image reading unit 11 and the image forming unit 12 from the image forming apparatus 10 shown in FIG. 2.

The configurations and processing shown in the above embodiment with reference to FIGS. 1 to 6 are merely illustrative of the present disclosure and not intended to limit the present disclosure to the above particular configurations and processing.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a display; and
   a control unit including a processor and functioning, when the processor executes a control program, as:
      a screenshot executing section acquiring an image being displayed on the display; and
      a control section, when an image is displayed on the display, and moreover a preset condition is satisfied, causing the display to display a message indicating that the image can be acquired by the screenshot executing section,
   wherein the condition is that the image being displayed on the display is of a same type with an image having been acquired previously by the screenshot executing section, and
   when an image is displayed on the display, and moreover the image is of the same type with the image having been acquired previously by the screenshot executing section, the control section causes the display to display the message.

2. The electronic device according to claim 1, further comprising a touch panel arranged on a screen of the display and operated by a user, wherein
   the condition includes enlarging, reducing, or moving of the image of the display is instructed by user operation on the touch panel, and
   when an image is displayed on the display, and moreover enlarging, reducing, or moving of the image of the display is instructed by the user operation on the touch panel, the control section causes the display to display the message.

3. The electronic device according to claim 1, wherein
   the condition includes an image of a preset type is displayed on the display, and
   when an image is displayed on the display, and moreover the image is the image of the preset type, the control section causes the display to display the message.

4. The electronic device according to claim 3, further comprising a storage unit previously storing a prescribed file extension, wherein
   when an image is displayed on the display, and moreover a type of the image is identified with reference to the file extension of the image and the file extension of the image matches with the prescribed file extension, the control section causes the display to display the message.

5. The electronic device according to claim 1, wherein if the message is displayed on the display once after an activation of the electronic device, the control section does not cause the display to display the message even when the image is displayed on the display and the condition is satisfied.

6. The electronic device according to claim 1, further comprising a storage unit storing history information, wherein
   every time the screenshot executing section acquires an image, the control section causes the storage section to store a file extension of the image as the history information, and
   when an image is displayed on the display, and moreover, with reference to the file extension of the image, the file extension of the image matches with any one file extension stored in the history information of the storage unit, the control section causes the display to display the message.

7. The electronic device according to claim 1, wherein after causing the display to display the message, the control section causes the display to display an image indicating an operation method for activating the screenshot executing section.

8. An image forming apparatus comprising:
   the electronic device according to claim 1; and
   an image forming unit forming the image acquired by the screenshot executing section on a recording sheet.

* * * * *